United States Patent

Kaupin

[15] 3,647,061
[45] Mar. 7, 1972

[54] NONWOVEN COTTON BALE COVER
[72] Inventor: William B. Kaupin, Westwood, Mass.
[73] Assignee: Ludlow Corporation, Needham Heights, Mass.
[22] Filed: Mar. 25, 1969
[21] Appl. No.: 810,307

[52] U.S. Cl. .................................................. 206/83.5, 161/89
[51] Int. Cl. ............................................................ B65d 71/00
[58] Field of Search .................................. 161/250, 249, 247, 89; 206/83.5

[56] References Cited

UNITED STATES PATENTS 239,795  4/1881  Jennings ............................... 206/83.5
2,971,643  2/1961  Farley ................................... 206/83.5

Primary Examiner—Joseph R. Leclair
Assistant Examiner—John M. Caskie
Attorney—Cesari and McKenna

[57] ABSTRACT

A nonwoven cotton bale cover is a bonded laminate of three layers of material. A layer of net is sandwiched between an outer layer of paper towelling and an inner layer of nonwoven cotton. The layers are bonded by means of a thermoplastic material applied to the outer or inner layer before they are joined.

6 Claims, 2 Drawing Figures

PATENTED MAR 7 1972

3,647,061

INVENTOR
WILLIAM B. KAUPIN
BY
*Blair Cesari + St. Onge*
ATTORNEYS

NONWOVEN COTTON BALE COVER

BACKGROUND OF THE INVENTION

1. Field of the Invention

The present invention relates to web laminates. More particularly, it relates to a nonwoven cotton bale cover.

2. Prior Art

For many years, the cotton industry has sought to find a more durable bale covering to protect the baled cotton from contamination and damage. The two bale cover types now commonly used are ones made from coarse jute yarn and those made from polypropylene ribbon yarn. Both types of covers are woven fabrics.

The woven jute bale cover is highly deficient as a protective medium. The loose weaving permits the entry of dirt, soil and moisture. It is therefore common to find mildew on the top and bottom surfaces of the stored cotton bales which are covered with woven jute. Furthermore, jute covers become unraveled and so badly damaged in bale handling that there is often little of the cover left by the time the bale reaches the cotton mill. Moreover, the damaged and broken strands of jute yarn and fiber contaminate the cotton and because of their fuzzy texture are difficult to remove. Yet another drawback of the jute bale covering is that its loosely fibrous and open texture renders the bale prone to ignition from sparks which may contact the bale. Since the likelihood of bale fires is increased by the use of jute covers, the accompanying higher insurance rates and danger to inventory and employees is a detrimental factor which must be considered by both the cotton gins and the mills.

When woven fabrics of polypropylene ribbon yarn are used as bale coverings, somewhat greater cover strength is achieved. Other problems, however, do arise. For example, polypropylene ribbon causes a highly vexatious form of contamination. When the polypropylene ribbon yarn is damaged in bale handling, the tiny strands of polypropylene that contaminate the bale are not always visible when the cover is removed and the bale is processed the mill. The polypropylene contaminants, however, cause cotton yarn imperfections that are highly visible in colored cotton fabrics. The reason for this is that the polypropylene fragments are resistant to all known methods of cotton dyeing and appear as white specks in the finished material. Contamination with both the above-type covers is aggravated when the covers are slitted for sampling and grading of the cotton since neither fabric is readily subject to patching.

In addition to the problems inherent in the typical bale cover materials, there is also a relatively high cost associated with the handling of bale covers. Usually, bale covers are shipped to the cotton gins in a precut and folded form. Generally, 50 folded covers are shipped in each package. With this arrangement, there is a considerable amount of labor involved in the cutting, folding and shipping of the bale covers and in the unwrapping and unfolding of the covers for use. Substantial cost savings could therefore be achieved if some of this cover handling could be eliminated.

It is therefore an object of the present invention to provide a low cost, tear- and abrasion-resistant cotton bale cover that does not contaminate the bale.

Another object of the present invention is to provide a low-cost cotton bale cover that facilitates slitting and sampling of the bale and repair of the cover.

A further object of the invention is to provide a cotton bale cover that may be shipped and dispensed in bulk form rather than in precut and folded form.

SUMMARY OF THE INVENTION

Our cotton bale cover is a three-layer laminate. The outer layer is a nonwoven paper, such as embossed paper towelling. The inner layer, which is in contact with the bale, is nonwoven cotton. Sandwiched between the inner and outer layers is a net. A thermoplastic material, which adheres the three layers of the laminate, may be applied as a dusting powder on one of the layers. The laminate is then subjected to heat, pressure, or both, to melt the thermoplastic material and bond the laminate.

This nonwoven laminate structure provides superb tear resistance which is attributable largely to the reinforcing net. It does not contaminate the bale because the inner layer, next to the bale, is cotton. Finally, it may readily be printed upon for bale identification and grading because the outer layer is paper. The paper outer layer also facilitates sampling of the bale, since the bale may be slitted with a knife, inspected and then resealed with conventional reinforcing tape.

BRIEF DESCRIPTION OF THE DRAWING

For a fuller understanding of the nature and objects of the invention, reference should be had to the following detailed description taken in connection with the drawing in which.

DESCRIPTION OF THE PREFERRED EMBODIMENTS

Figure 2:
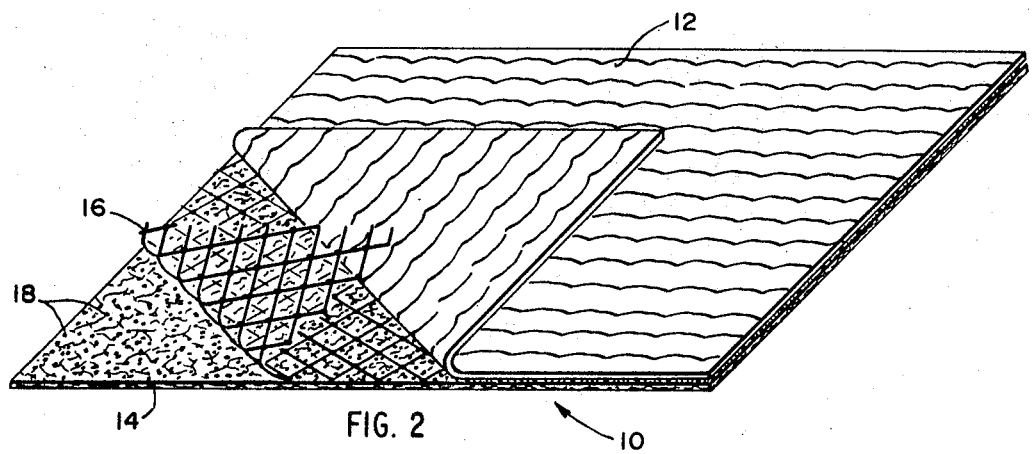
FIG. 2 is a perspective view, partially peeled open, of my nonwoven cotton bale cover laminate.
Figure 1:
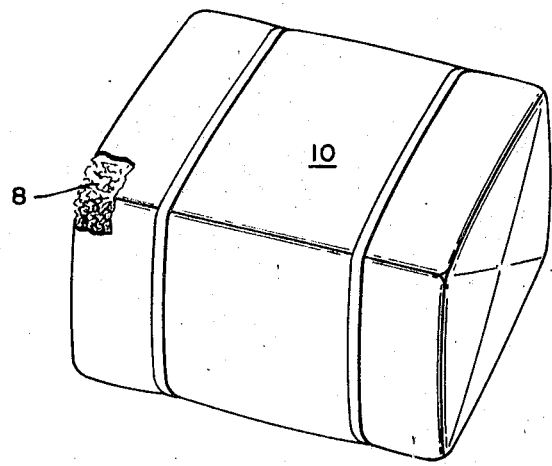
FIG. 1 is a perspective view of a cotton bale wrapped in the cover of my invention.

As shown in FIG. 1, baled cotton 8 is wrapped in my cover 10. The cotton bale cover laminate 10, however, is made of three layers as illustrated in FIG. 2. The outer layer 12 is a paper, such as embossed paper towelling. The inner layer, which in use is next to the bale, is made of nonwoven cotton. Sandwiched between the paper outer layer 12 and nonwoven cotton inner layer 14 is an extruded filament net 16 which may be made of any suitable, low cost, mildew- or corrosion-resistant fibers, such as glass fibers or oriented polypropylene.

EXAMPLE I

To make our laminate, we form a random-laid nonwoven web 14 of cotton or cotton-blend fibers weighing 1 to 1½ ounces per square yard. Using an Oxy-Dry unit (a powder-dispensing apparatus made by the Oxy-Dry Corporation of New York, New York), we dust the surface of the web 14 with a thermoplastic powder 18 such as ethylene acrylate copolymer. We then overlay the web 14 with an extruded filament net 16, such as Conwed-extruded and oriented net (an oriented polypropylene fiber net made by the Conwed Corporation of Minneapolis, Minnesota). The material used for the filament net should have a melting point higher than that of the thermoplastic powder. Following this, we place a sheet of embossed paper towelling 12 upon the surface of the Conwed net 16.

The laminate is then bonded under heat and pressure, for example, by passing it through a machine such as that described in copending application Ser. No. 774,383, filed Nov. 8, 1968. assigned to the assignee of the present invention. The bonded process causes the thermoplastic powder to become activated, thereby binding the nonwoven cotton web 14 to itself and through the openings of the net to the inner surface of the paper layer 12.

EXAMPLE II

Alternatively, our laminate may be made by forming a random-laid nonwoven web 12 of cotton or cotton-blend fibers weighing 1 to 1½ ounces per square yard and dusting the surface of the web with a thermoplastic powder 18 in the manner indicated in Example I above. At this point, however, the powder-coated cotton web 14 may be passed under a bank of infrared lamps with the net 16 and paper 12 added and adhered thereto by immediately passing the laminate through calender rolls.

When made in accordance with the foregoing techniques, our laminate provides a strong, tear- and abrasion-resistant material that will maintain its integrity despite the rough handling that a cotton bale normally encounters. Although our material is porous, the pores are too small to admit dirt, soil or water. On the other hand, the pores are sufficiently large to permit free passage of air. Moreover, our material will not delaminate or unravel. It is highly resistant to cutting by the steel bands that bind the bale. The paper outside layer of the cover is devoid of any fuzziness which greatly minimizes or eliminates the danger of bale fires. Furthermore, the outside paper layer permits the use of reinforced adhesive tape to reseal slits which are made in the cover to sample the cotton in the bale. The paper layer 12 also provides an excellent surface upon which to print information for bale identification purposes.

Another unique feature of our nonwoven cotton bale laminate is that it may be slipped in roll form. By perforating the rolled material at predetermined intervals, it is possible to tear off segments of the material as needed. In this manner, each segment torn from the roll may be used as a cotton bale cover thus obviating the necessity of precutting, folding, packaging, shipping, unpacking and unfolding the bale cover for use. From this it may be seen that our bale cover may also provide a substantial savings in labor as compared to prior art covers and techniques for packaging and shipping the covers.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

I claim:

1. A nonwoven cotton bale cover laminate comprising:
   A. a paper outer layer;
   B. a nonwoven cotton inner layer;
   C. a net interposed between said outer and inner layers; and
   D. a thermoplastic material bonding said inner and outer layers through the interstices of said net.
2. The cotton bale cover laminate of claim 1 wherein said paper layer is embossed paper towelling.
3. The cotton bale cover laminate of claim 1 wherein said net is thermoplastic.
4. The cotton bale cover laminate of claim 1 wherein said paper layer is embossed paper towelling and said net is thermoplastic.
5. The cotton bale laminate of claim 4 wherein said thermoplastic bonding material is a powder dusted onto said cotton inner layer and said laminate is bonded by heat and pressure sufficient to melt said thermoplastic powder and cause it to flow through said thermoplastic net into said paper towelling.
6. A cotton bale and cover comprising:
   A. a compressed bale of cotton; and
   B. a cover surrounding said bale, said cover having
      1. a paper outer layer;
      2. a nonwoven cotton inner layer;
      3. a net interposed between said outer and inner layers; and
      4. a thermoplastic material bonding said inner and outer layers through the interstices of said net.

* * * * *